United States Patent
Fujii et al.

[11] Patent Number: 5,905,578
[45] Date of Patent: May 18, 1999

[54] CODING APPARATUS

[75] Inventors: Akio Fujii; Yoshiki Ishii, both of Yokohama, Japan

[73] Assignee: Canon Kabushiki Kaisha, Tokyo, Japan

[21] Appl. No.: 08/575,577

[22] Filed: Dec. 20, 1995

[30] Foreign Application Priority Data

Dec. 22, 1994 [JP] Japan .................................. 6-320118

[51] Int. Cl.$^6$ .......................... H04N 1/417; H04N 1/411; H04N 1/415
[52] U.S. Cl. .................................. 358/262.1; 358/261.2; 358/430; 358/432; 358/433
[58] Field of Search .......................... 358/261.1, 261.2, 358/426, 261.4, 430, 432, 433, 262.1; 382/251, 253, 238, 239; 348/405, 384, 419; 341/200, 51, 63

[56] References Cited

U.S. PATENT DOCUMENTS

| | | | |
|---|---|---|---|
| 5,073,821 | 12/1991 | Juri | 358/133 |
| 5,086,488 | 2/1992 | Kato et al. | 382/232 |
| 5,150,208 | 9/1992 | Otaka et al. | 358/133 |
| 5,168,375 | 12/1992 | Reisch et al. | 358/432 |
| 5,170,264 | 12/1992 | Saito et al. | 358/433 |
| 5,251,029 | 10/1993 | Enari et al. | 358/133 |
| 5,289,289 | 2/1994 | Nagasaki | 358/432 |
| 5,291,282 | 3/1994 | Nakagawa et al. | 348/384 |
| 5,325,374 | 6/1994 | Hoshi et al. | 371/43 |
| 5,410,352 | 4/1995 | Watanabe | 348/405 |
| 5,416,615 | 5/1995 | Shirota | 358/261.3 |
| 5,487,119 | 1/1996 | Kimura et al. | 382/239 |
| 5,542,008 | 7/1996 | Sugahara et al. | 348/405 |
| 5,568,278 | 10/1996 | Nakano et al. | 358/433 |
| 5,625,714 | 4/1997 | Fukuda | 382/233 |
| 5,644,658 | 7/1997 | Sugahara et al. | 382/248 |

FOREIGN PATENT DOCUMENTS

| | | |
|---|---|---|
| 0447247 | 9/1991 | European Pat. Off. . |
| 0469835 | 2/1992 | European Pat. Off. . |
| 0470773 | 2/1992 | European Pat. Off. . |
| 0481768 | 4/1992 | European Pat. Off. . |
| 0558016 | 9/1993 | European Pat. Off. . |
| 0677968 | 10/1995 | European Pat. Off. . |
| 0705039 | 4/1996 | European Pat. Off. . |
| 2638926 | 11/1988 | France . |
| 05252403 | 9/1993 | Japan . |

*Primary Examiner*—Kim Yen Vu
*Assistant Examiner*—Kimberly A. Williams
*Attorney, Agent, or Firm*—Fitzpatrick, Cella, Harper & Scinto

[57] ABSTRACT

A coding apparatus has a quantizer selected from a quantizer group and being used for coding inputted data, a first code amount calculation circuit for calculating a code amount of codes of the inputted data quantized by the quantizer, a prediction circuit for predicting a quantizer among the quantizer group capable of obtaining a target code amount, in accordance with the code amount calculated by the first code amount calculation circuit, the quantizer predicted by the prediction circuit for quantizing the inputted data, a second code amount calculation circuit for calculating a code amount of codes of the inputted data quantized by the predicted quantizer, and a comparator circuit for comparing the code amount calculated by the second code amount calculation circuit with the target code amount.

16 Claims, 12 Drawing Sheets

HORIZONTAL
LOW → HIGH

VERTICAL
LOW ↓ HIGH 0
1
M-2
M-1

| QUANTI-ZATION TABLE \ AREA | 0 | 1 | | M-2 | M-1 |
|---|---|---|---|---|---|
| $Q_{N-1}$ | 1 | 1 | ---------- | 1/2 | 1/2 |
| $Q_{N-2}$ | 1 | 1 | ---------- | 1/2 | 1/4 |
| $Q_{N-3}$ | 1 | 1 | ---------- | 1/4 | 1/4 |
| ⋮ | ⋮ | ⋮ | ⋮ | ⋮ | ⋮ |
| $Q_1$ | 1/8 | 1/16 | | 1/64 | 1/64 |
| $Q_0$ | 1/16 | 1/16 | | 1/64 | 1/64 |

…

CODING APPARATUS

BACKGROUND OF THE INVENTION

1. Field of the Invention

The present invention relates to a coding apparatus in which a code amount for length fixing is calculated during variable length coding.

2. Related Background Art

In a conventional method of highly efficiently coding image data, the image data is divided into a small block of i×j pixels, a small block is orthogonally transformed, (e.g., two-dimensional discrete cosine transformation (DCT)), the orthogonally transformed coefficients are quantized while considering the human visual sense characteristics, and the quantized coefficients are transformed into a variable length code (e.g., a Huffman code which is a combination of a run length of 0 coefficients and amplitudes of significant coefficients).

In recording variable length coded data in a VTR or the like, k small blocks (k≧1, integer) are coded so as to match a record or transmission rate, and the code amount after coding is controlled to be $R_K$ or smaller.

FIG. 1 shows a conventional coding apparatus which performs such a code amount control.

In FIG. 1, reference numeral 1300 represents an input terminal for image data to be orthogonally transformed, reference numerals 1302$_0$ to 1302$_{N-1}$ represent a table number of each quantization table or an input terminal for a quantization step, reference numeral 1304 represents a FIFO for delaying input image data by a time required for determining a quantization table by which the input image data is quantized.

Reference numerals 1306$_0$ to 1306$_{N-1}$ represent a quantization circuit for quantizing orthogonally transformed image data, reference numerals 1308$_0$ to 1308$_{N-1}$ represent a code length generation circuit for generating a code length of image data quantized and variable-length coded, reference numerals 1310$_0$ to 1310$_{N-1}$ represent an adder circuit for adding code lengths, and reference numerals 1312$_0$ to 1312$_{N-1}$ represent a latch circuit for latching a code length added each time a code is generated.

Reference numeral 1314 represents a selection circuit which selects, from N code amounts obtained through variable length coding of k small blocks by N quantization tables, the code amount nearest to a desired amount $R_k$, and outputs a corresponding quantization table $Q_n$ or its quantization table number n (0≦n≦N−1) from an output terminal 1318. Reference numeral 1316 represents an output terminal of delayed image data from FIFO 1304.

The operation of the coding apparatus structured as above will be described.

Image data is divided into small blocks. Each small block is orthogonally transformed (e.g., two-dimensional DCT), and the transformed image data is applied to the input terminal 1300. The quantization circuits 1306$_0$ to 1306$_{N-1}$ divide two-dimensionally DCT image data of each small block into M areas in the range from low to high frequencies, for example, as shown in FIG. 2, and quantize at a predetermined step size which becomes coarse from the area 0 to area N−1 toward the high frequency range while considering the human visual sense characteristics, for example, as shown in FIG. 3.

The quantization circuit 1306$_0$ is supplied with a quantization table $Q_0$ from the input terminal 1302$_0$, and quantizes DCTed image data of a small block, at a step size of 1/16 for the area 0, 1/16 for the area 1, . . . , and 1/64 for the area M−1, in accordance with the quantization table $Q_0$. The image data of the small block quantized by the quantization circuit 1306$_0$ using the quantization table $Q_0$ is supplied to the code length generation circuit 1308$_0$. The code length generation circuit 1308$_0$ generates a code length of a variable length code suitable for the quantized image data and supplies it to the adder circuit 1310$_0$. The variable length code is, for example, a two-dimensional Huffman code which is a combination of a run length of 0 values of quantized image data and significant values.

The adder circuit 1310$_0$ is supplied with a code length from the code length generation circuit 1308$_0$ and with a cumulative value of past code lengths from the latch circuit 1312$_0$, and adds the two values, the result being supplied to the latch circuit 1312$_0$. The latch circuit 1312$_0$ latches the added value from the adder circuit 1310$_0$ and supplies it to the adder circuit 1310$_0$ and also to the selection circuit 1314. The value latched in the latch circuit 1312$_0$ is reset to "0" each time a set of k small blocks as the length fixing unit has been processed.

Similar to the above, the quantization circuits 1306$_1$ to 1306$_{N-1}$ quantize orthogonally transformed image data by using quantization tables $Q_1$ to $Q_{N-1}$, and the code length generation circuits 1308$_1$ to 1308$_{N-1}$, adder circuits 1310$_1$ to 1310$_{N-1}$, and latch circuits 1312$_1$ to 1312$_{N-1}$ operate in the similar manner as above for the quantized image data. Each latch circuit 1312$_1$ to 1312$_{N-1}$ is reset to "0" at a similar timing in the unit of k small blocks. In this manner, the latch circuit 1312$_0$ to 1312$_{N-1}$ calculate code amounts $RQ_0$ to $RQ_{N-1}$ of codes of the orthogonally transformed k small blocks quantized by using the quantization tables $Q_0$ to $Q_{N-1}$.

The selection circuit 1314 is supplied with N code amounts $RQ_0$, $RQ_1$, . . . , $RQ_{N-1}$ for each set of k small blocks from the latch circuits 1312$_0$, 1312$_1$, . . . , 1312$_{N-1}$. The selection circuit 1314 selects, from these N code amounts, the largest $RQ_n$ satisfying $R_{QN} \leq R_K$ which is determined to be the code amount of the fixed length code, and outputs a corresponding quantization table $Q_n$ or its quantization table number n (0≦n≦N−1) from the output terminal 1318. FIFO 1304 delays orthogonally transformed image data by a time required for the selection circuit 1314 to determine the quantization table.

After the quantization table is determined, a circuit (not shown) quantizes the image data delayed by FIFO 1304 by using the determined quantization table $Q_n$ and codes the quantized image data into variable length codes to obtain desired codes.

With the above conventional coding apparatus, however, in order to compress k small blocks into a desired code amount $R_K$ or smaller, N quantization circuits and N code amount calculating circuits corresponding in number to N quantization tables are required. The coding apparatus has therefore a bulky amount of hardware.

Since k small blocks are quantized by using the same quantization table $Q_n$, the code amount $R_{QN}$ after length fixing becomes too small depending upon image data, and a difference $R_K - R_{QN}$ from the target code amount $R_K$ becomes too large. Therefore, an empty area is generated in a record or transmission area, which is not efficient and an image is degraded.

SUMMARY OF THE INVENTION

It is a first object of the present invention to provide a coding apparatus capable of fixing a length of a code amount with less hardware.

It is a second object of the present invention to provide a coding apparatus capable of efficiently using a record or transmission area by reducing an empty area and capable of improving an image quality, by reducing a difference $R_K-R_{QN}$ from the target code amount $R_K$ as much as possible.

According to a first embodiment of the invention, a coding apparatus comprises: a quantizer selected from a quantizer group and being used for coding inputted data; a first code amount calculation means for calculating a code amount of codes of the inputted data quantized by the quantizer; a prediction means for predicting a quantizer among the quantizer group capable of obtaining a target code amount, in accordance with the code amount calculated by the first code amount calculation means; the quantizer predicted by the prediction means for quantizing the inputted data; a second code amount calculation means for calculating a code amount of codes of the inputted data quantized by the predicted quantizer; and a comparator means for comparing the code amount calculated by the second code amount calculation means with the target code amount.

According to a second embodiment of the invention, a coding apparatus comprises: a quantizer selected from a quantizer group and being used for coding inputted data; a first code amount calculation means for calculating a code amount of codes of the inputted data quantized by the quantizer; a first prediction means for predicting a first quantizer among the quantizer group capable of obtaining a target code amount, in accordance with the code amount calculated by the first code amount calculation means; the first quantizer predicted by the first prediction means for quantizing the inputted data; a second code amount calculation means for calculating a code amount of codes of the inputted data quantized by the first quantizer; and a second prediction means for predicting a second quantizer among the quantizer group capable of obtaining the target code amount, in accordance with the code amount calculated by the second code amount calculation means.

In the first embodiment, quantization is performed by using a quantizer selected from a quantizer group, its code amount is calculated by the first code amount calculation means, a quantizer capable of obtaining the target code amount is predicted in accordance with the code amount, quantization is further performed by using the predicted quantizer, its code amount is calculated by the second code amount calculating means, and the calculated code amount and the target code amount are compared by the comparator means. In accordance with the comparison result, a quantizer used for length fixing is decided.

According to the second embodiment, quantization is performed by using a quantizer selected from a quantizer group, its code amount is calculated by the first code amount calculation means, a first quantizer capable of obtaining the target code amount is predicted in accordance with the code amount, quantization is further performed by using the first quantizer, its code amount is calculated by the second code amount calculating means, and the second quantizer used for length fixing is decided.

The above and other objects and advantages of the invention will become apparent from the following detailed description when read in conjunction with the accompanying drawings.

DETAILED DESCRIPTION OF THE PREFERRED EMBODIMENTS

Figure 4:
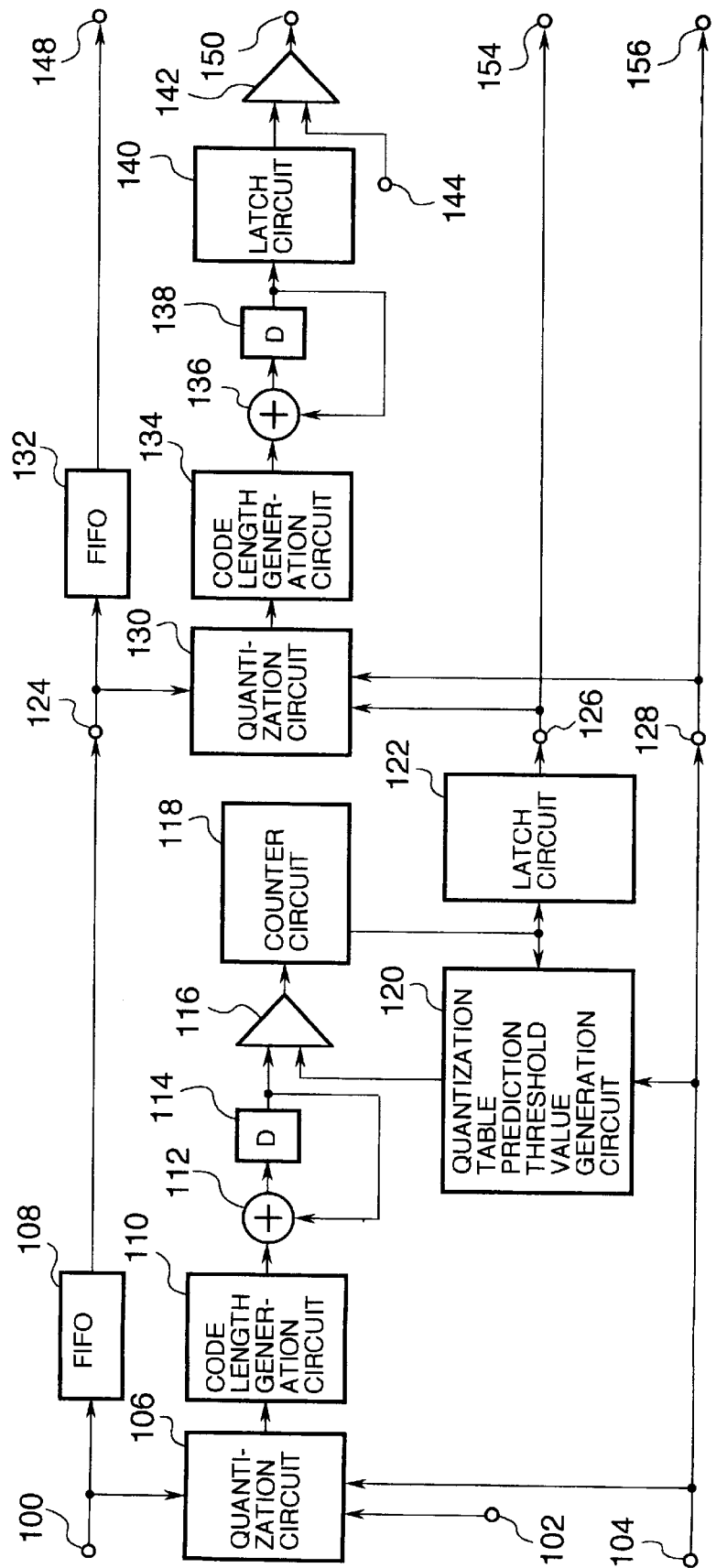
FIG. 4 is a block diagram illustrating a first embodiment of the invention.

FIG. 4 is a block diagram showing the first embodiment of the invention. In FIG. 4, reference numeral 100 represents an input terminal for image data orthogonally transformed (e.g., two-dimensional DCT). Reference numeral 102 represents an input terminal for a quantization table number (or quantization step size). Reference numeral 104 represents an input terminal for a mode signal (high definition image or standard definition image) of inputted image data. Reference numeral 106 represents a quantization circuit for quantizing orthogonally transformed image data. Reference numeral 108 represents a FIFO for delaying orthogonally transformed image data. Reference numeral 110 represents a code length generation circuit for generating a code length of variable length code of the quantized image data (for example, a two-dimensional Huffman code which is a combination of a run length of 0 data and a value of significant data). Reference numeral 112 represents an adder circuit for cumulatively adding a code length each time a code is generated. Reference numeral 114 represents a latch circuit for latching a cumulative code length. Reference numeral 116 represents a comparator circuit for comparing a quantization table prediction threshold value and a cumulative code length. Reference numeral 118 represents a counter circuit which counts down its value when the comparator circuit 116 detects that the cumulative value is in excess of the prediction threshold value. Reference numeral 120 represents a quantization table prediction value generation circuit for generating a quantization table prediction threshold value in accordance with the count of the counter circuit 118 and the mode signal. Reference numeral 122 represents a latch circuit for latching the predicted quantization table number.

Reference numerals 124, 126, and 128 represent input/output terminals for FIFO 108, latch circuit 122, and mode signal. Reference numeral 130 represents a quantization circuit similar to the quantization circuit 106 for quantizing orthogonally transformed image data. Reference numeral 132 represents a FIFO similar to FIFO 108 for delaying orthogonally transformed image data. Reference numeral 134 represents a variable length code generation circuit which operates in the similar manner to the code length generation circuit 110. Reference numeral 136 represents an adder circuit similar to the adder circuit 112 for cumulatively adding a code length. Reference numeral 138 represents a latch circuit similar to the latch circuit 114 for latching the cumulative code length. Reference numeral 140 represents a latch circuit for latching the cumulative code length for each length fixing unit (k small blocks). Reference numeral 142 represents a comparator circuit for comparing the cumulative code length with a target code amount $R_K$. Reference numeral 144 represents an input terminal for the target code amount $R_K$. Reference numerals 148, 150, 154, and 156 represent output terminals for FIFO 132, comparator circuit 142, latch circuit 122, and mode signal of high definition (HD) or standard definition (SD).

Next, the operation of the coding apparatus constructed as above will be described.

Image data orthogonally transformed (two-dimensional DCT) for each small block is applied to the input terminal and supplied to the quantization circuit 106 and FIFO 108. The quantization circuit 106 is supplied with one quantization table $Q_p$ ($0 \leq p \leq N-1$, e.g., p=N/2) among those quantization tables shown in FIGS. 8A to 8D, quantizes the orthogonally transformed image data in accordance with the supplied quantization table $Q_p$, and supplies the results to the code length generation circuit 110. The code length generation circuit 110 generates a code length of variable length code (two-dimensional Huffman code) assigned in accordance with the quantized image data supplied from the quantization circuit 106, and supplies it to the adder circuit 112. The adder circuit 112 adds the code length supplied from the code length generation circuit 110 to the cumulative value of past code lengths supplied from the latch circuit 114, and supplies the added result to the latch circuit 114. The latch circuit 114 latches the added result supplied from the adder circuit 112, and supplies it to the comparator circuit 116 and adder circuit 112. The latch circuit 114 resets the latched value to "0" for each set of k small blocks which is a length fixing unit. The comparator circuit 116 compares the cumulative value of code lengths supplied from the latch circuit 114 with the value supplied from the quantization table prediction threshold value generation circuit 120.

The prediction threshold value supplied from the quantization table prediction threshold value generation circuit 120 will be described. Image data of k small blocks is quantized by the quantization table $Q_p$, and its code amount $IQ_p$ is calculated. At the same time, a quantization table $Q_n$ for fixed length is also calculated, this quantization table $Q_n$ having a maximum code amount $RQ_n$ satisfying $R \leq R_K$ where $R_K$ is a target code amount and R is a coded code amount. A quantization table $Q'_n$ corresponding to the target code amount $R_K$ is obtained through interpolation of $RQ_n$ and $RQ_{n+1}$.

Figure 5:
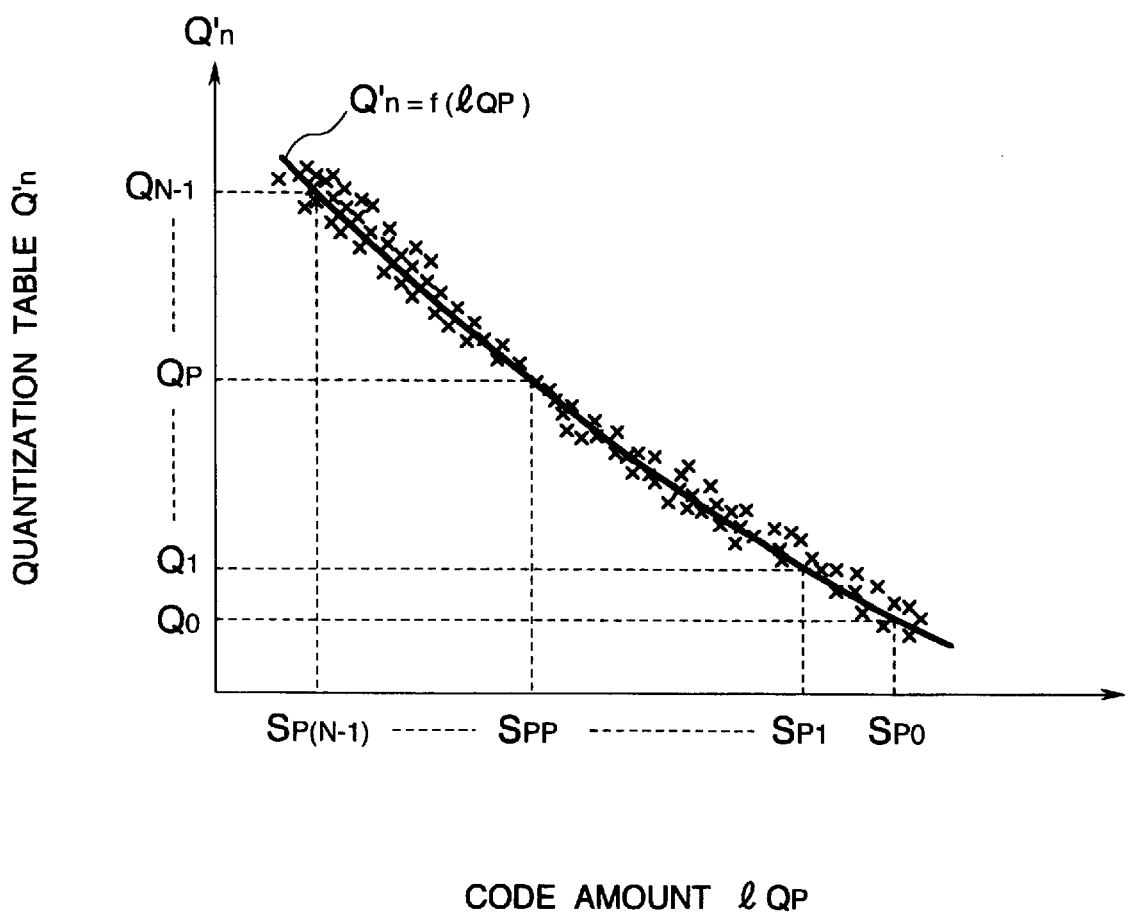
FIG. 5 is a graph showing statistical values obtained by a quantization circuit.

($IQ_p$, $Q'_n$) values for various image data calculated in the above manner have a high correlation as shown in FIG. 5, and can be approximated to a curve $Q'_n=f(IQ_p)$. By using the curve $Q'_n=f(IQ_p)$ shown in FIG. 5, the quantization table $Q_n$ adaptive to length fixing is predicted in accordance with the code amount $IQ_p$ obtained by quantizing image data of k small blocks by using the quantization table $Q_p$. If the code amount is $S_{p(N-1)}$ or smaller, a quantization table $Q_{N-1}$ is predicated, . . . , and if the code amount is $S_{p(N-2)}$ or smaller, a quantization table $Q_{N-2}$ is predicated. In this manner, a quantization table adaptive to length fixing is predicted.

When the first block of k small blocks of the length fixing unit starts to be processed by the quantization circuit 106, the latch circuit 114 is reset to "0" and the counter circuit 118 is set to a count N−1. Upon reception of a value N−1 from the counter circuit 118, the quantization table prediction threshold value generation circuit 120 supplies first a prediction threshold value $S_{p(N-1)}$ to the comparator circuit 116. The comparator circuit 116 compares the prediction threshold value $S_{p(N-1)}$ with the cumulative code length sequentially supplied from the latch circuit 114. If the cumulative value is $S_{p(N-1)}$ or smaller, a low level signal is supplied to the counter circuit 118, and if the cumulative value is in excess of $S_{p(N-1)}$, a high level signal is supplied to the counter circuit 118.

If the signal supplied from the comparator circuit 116 is the high level signal, the counter circuit 118 counts down its count to N−2, and supplies it to the quantization table prediction threshold value generation circuit 120. Upon reception of this value N−2, the circuit 120 supplies the next prediction threshold value $S_{p(N-2)}$ to the comparator circuit 116. Then, the comparator circuit 116 compares the cumulative value with $S_{p(N-2)}$. In this manner, the comparator circuit 116 compares the cumulative code amount supplied from the latch circuit 114 with the prediction threshold value supplied from the quantization table prediction threshold value generation circuit 120, and outputs the low level signal if the cumulative value is the prediction threshold value or smaller, and the high level signal if it is in excess of the prediction threshold value, respectively to the counter circuit 118. If the low level signal is supplied from the comparator circuit 116, the counter circuit 118 holds the present counter value, and if the high level signal is supplied, it decrements by −1 (count down) and supplies the result to the quantization table threshold value generation circuit 120. Then, this circuit 120 generates the prediction threshold value corresponding to the count supplied from the counter circuit 118, and supplies it to the comparator circuit 116.

After the image data of k-th small block is processed, the count n held in the counter circuit 118 represents the number of the predicted quantization table $Q_n$. When the image data of k small blocks is processed, the latch circuit 122 latches the output value n of the counter circuit 118, and supplies it to the quantization circuit 130. FIFO 108 delays the orthogonally transformed image data by a time required for processing k small blocks. Thereafter, the latch circuit 114 and counter circuit 118 are again initialized to start processing the next k small blocks.

Upon reception of the image data delayed by FIFO 108, the quantization circuit 130 quantizes the image data by using the quantization table $Q_n$ corresponding to the output value n of the latch circuit 122, and supplies the quantized image data to the code length generation circuit 134. Similar to the code length generation circuit 110, the code length generation circuit 134 generates a code length of a variable length encoded code (e.g, two-dimensional Huffman code) of the quantized image data, and supplies it to the adder circuit 136. Similar to the adder circuit 112, the adder circuit 136 adds the output value of the code length generation circuit 134 to the value supplied from the latch circuit 138, and supplies the added result to the latch circuit 138. The latch circuit 138 latches the added value supplied from the adder circuit 136, and supplies it to the adder circuit 136. The latch circuit 138 as well as the latch circuit 114 is reset to "0" when the first small block among k small blocks as the length fixing unit starts to be processed.

When the k small blocks as the length fixing unit are processed, the cumulative value $RQ_n$ of code lengths latched in the latch circuit 138 is latched by the latch circuit 140 which in turn outputs it to the comparator circuit 142. The cumulative value $RQ_n$ is a code amount of the image data of k small blocks quantized by the predicated quantization table $Q_n$ and coded through length fixing. The comparator circuit 142 compares the cumulative code amount $RQ_n$ supplied from the latch circuit 140 with the target code amount $R_K$ supplied from the input terminal 144, and outputs a low level signal if $RQ_n \leq R_K$ and the high level signal if $RQ_n > R_K$, respectively from the output terminal 150.

FIFO 132 delays the orthogonally transformed (two-dimensional DCT) image data by a time required for processing k small blocks, and outputs it from the output terminal 148. Outputted from the output terminal 154 is the number n corresponding to the predicted quantization table $Q_n$ to be used for length fixing and supplied from the latch circuit 122.

Inputted from the input terminal 104 is a mode signal indicating whether the inputted image data is for a high definition image (HD) or a standard definition image (SD). This mode signal is supplied to the quantization circuits 106 and 130 and quantization table prediction threshold value generation circuit 120. The quantization circuits 106 and 130 select either the quantization table for the high definition image (HD) or the quantization table for the standard definition image (SD) in accordance with the mode signal supplied from the input terminal 104. Similarly, the quantization table prediction threshold value generation circuit 120 selects either the quantization table for the high definition image (HD) or the quantization table for the standard definition image (SD) in accordance with the mode signal supplied from the input terminal 104. The image data quantized by the quantization circuit 130 may be supplied to a succeeding stage coding circuit (not shown) to code it into a variable length code (e.g., two-dimensional Huffman code).

Figure 1:
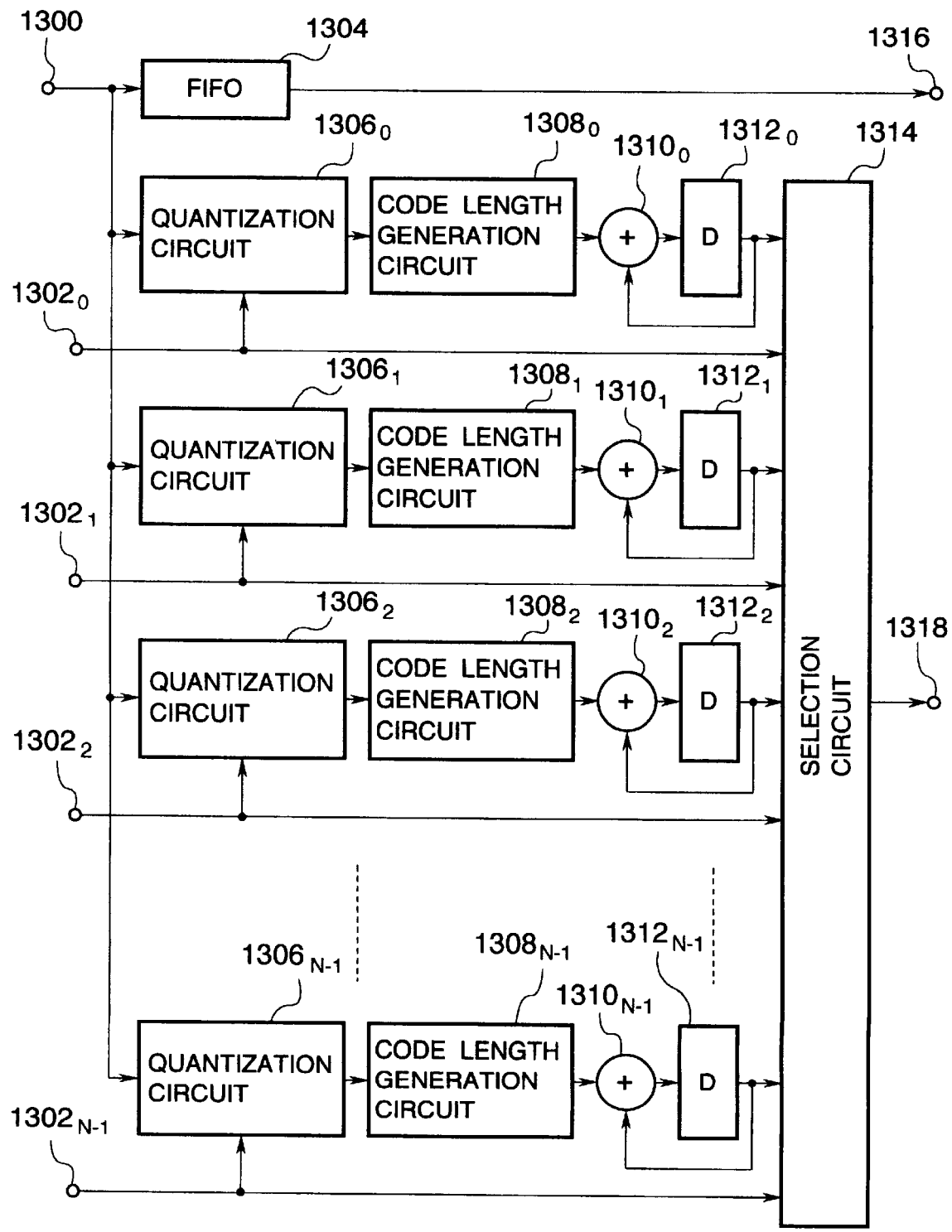
FIG. 1 is a block diagram showing a conventional coding apparatus.
Figures 2, 3:
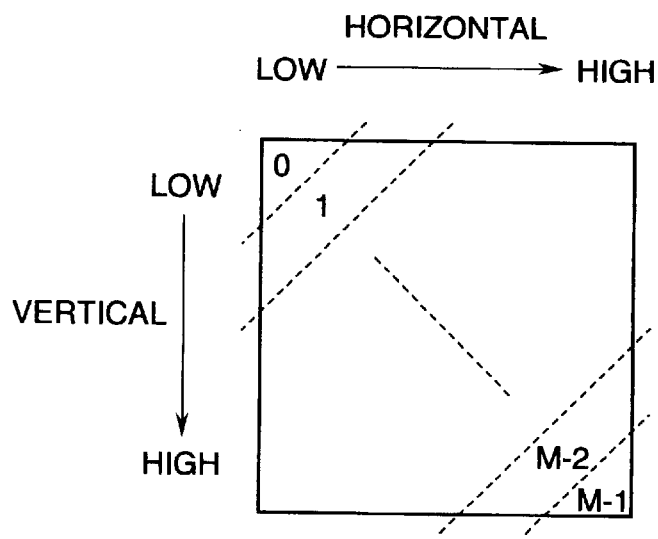
FIG. 2 is a diagram illustrating an area of each quantization step used for quantizing orthogonally transformed (two-dimensional DCT) image data.
FIG. 3 is a table illustrating examples of step sizes used by a quantization circuit.

According to the embodiment described above, inputted orthogonally transformed (two-dimensional DCT) image data is quantized by one quantization table $Q_p$ among those quantization tables, the code amount $RQ_p$ of variable length code is calculated, and a quantization table $Q_n$ adaptive to length fixing is predicted from the code amount $RQ_p$. Next, the orthogonally transformed image data is quantized by using the predicted quantization table $Q_n$ to confirm whether the target code amount $R_K$ is satisfied. Accordingly, the amount of hardware can be reduced considerably as compared to the conventional apparatus shown in FIG. 1.

In addition, the high definition image (HD) and standard definition image (SD) mode signals are provided to select corresponding ones of the quantization table and threshold value. Accordingly, the coding apparatus of this embodiment can be used for both the high definition image (HD) and standard definition image (SD).

Figure 6:
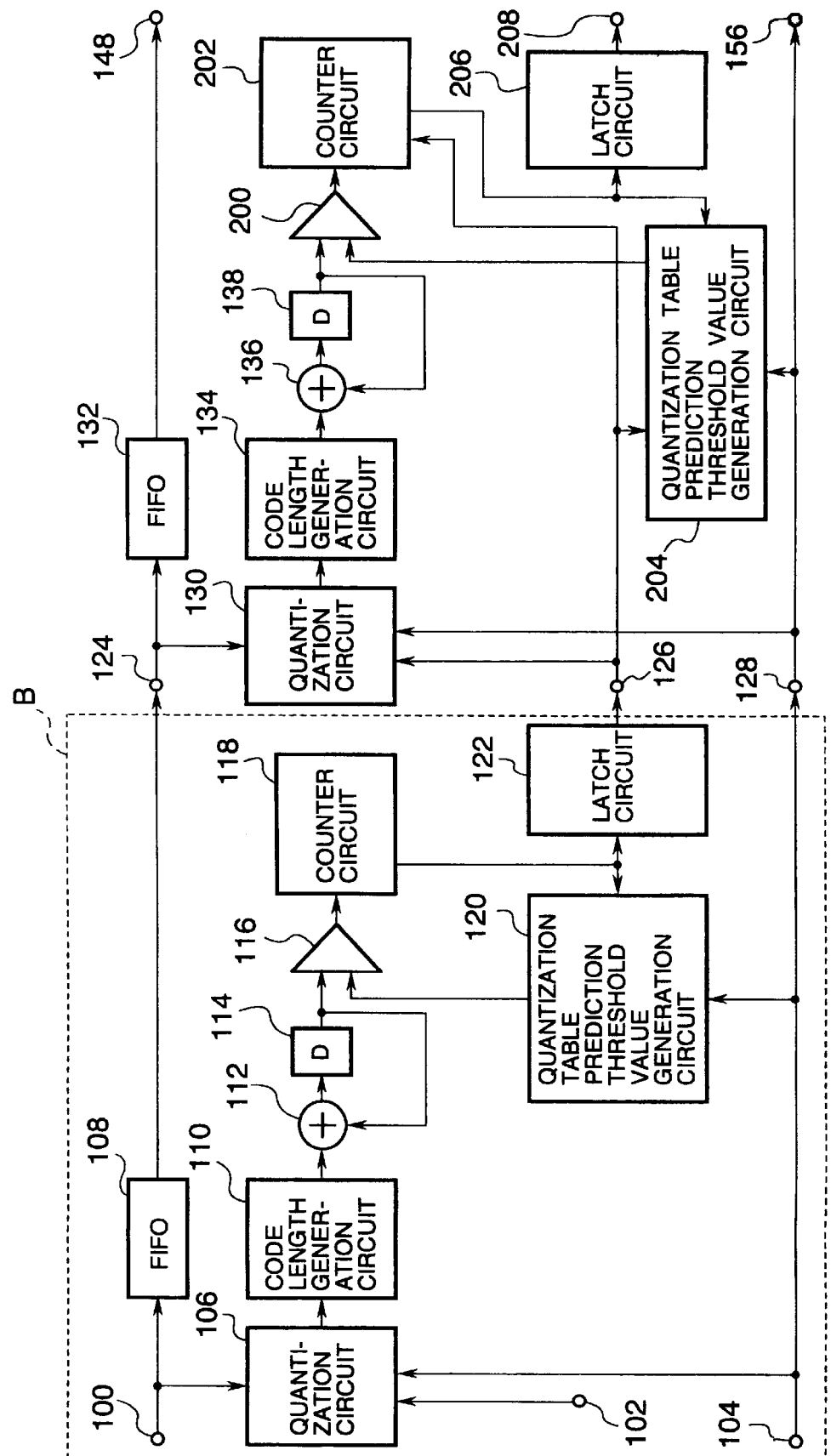
FIG. 6 is a block diagram illustrating a second embodiment of the invention.

FIG. 6 is a block diagram illustrating the second embodiment of this invention. Elements having similar functions to those of the first embodiment of FIG. 4 are represented by identical reference numerals. Only different points from the first embodiment will be described.

Referring to FIG. 6, the latch circuit 138 sequentially supplies the cumulative code length of image data quantized by a quantization table predicted as described above and coded in variable length (e.g., two-dimensional Huffman code), to the comparator circuit 200 which compares the cumulative code length with the prediction threshold value supplied from a quantization table prediction threshold value generation circuit 204.

Next, three types of the operation of the quantization table prediction threshold value generation circuit 204 will be described.

(1) The counter circuit 202 sets its count to N−1 and supplies it to the quantization table prediction threshold value generation circuit 204, when the preceding circuit B completes the process of k small blocks as the length fixing unit, when the latch circuit 122 latches the number n corresponding to the predicted quantization table $Q_n$ and output it, and when the quantization circuit 130 starts processing of the k small blocks delayed by FIFO 108 by using the quantization table $Q_{n'}$. The quantization table prediction threshold value generation circuit 204 is supplied with the output value n of the latch circuit 122 and the count N−1 from the counter circuit 202, and generates a prediction threshold value $S_{n(N-1)}$ which is supplied to the comparator circuit 200.

Figure 7:
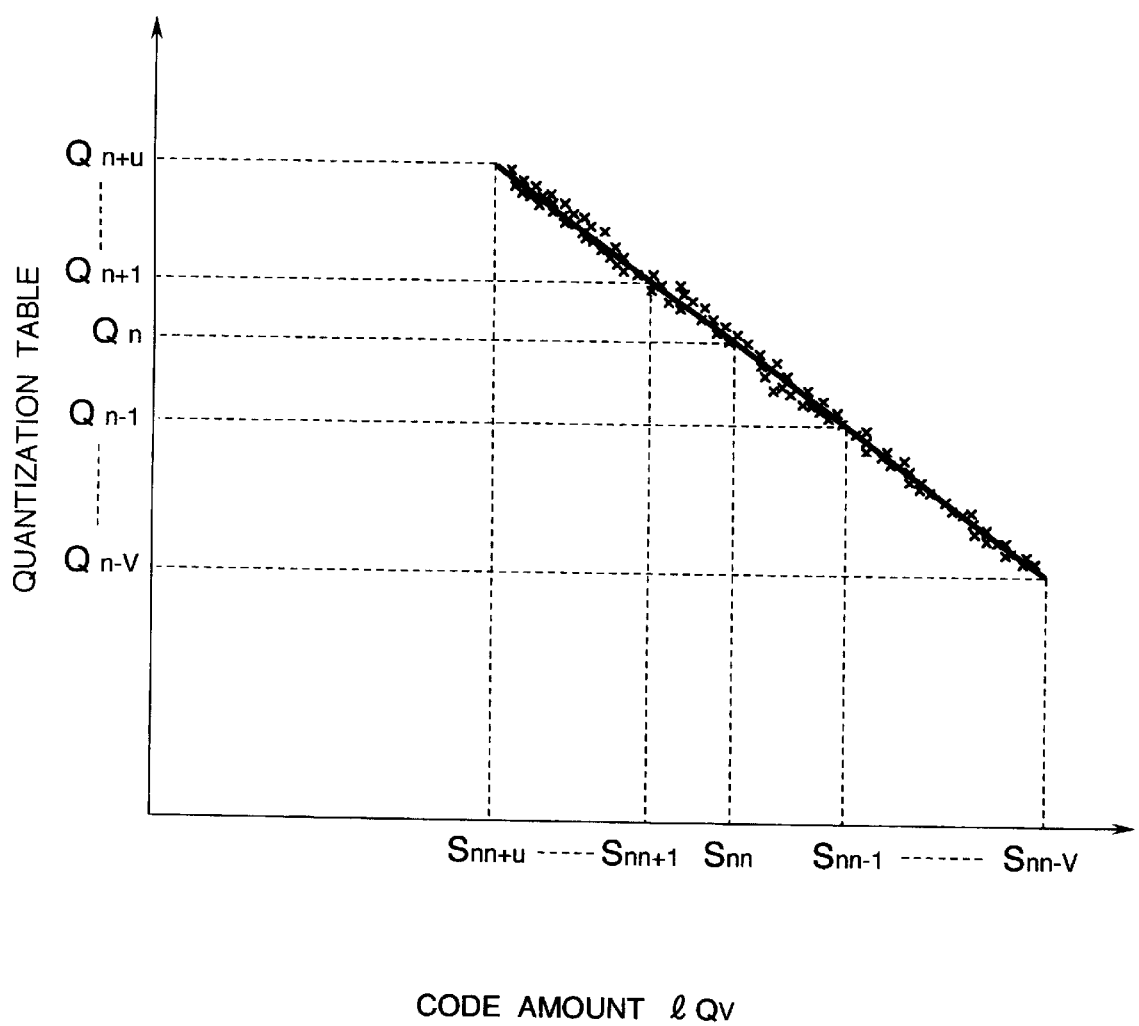
FIG. 7 is a graph showing statistical values obtained by a quantization circuit.

The quantization table prediction threshold value generation circuit 204 stores, as shown in FIG. 7, prediction threshold values $S_{n0}$, $S_{n1}$, ..., $S_{n(N-1)}$ (n=0, 1, ..., N−1) for each of the quantization tables $Q_0$, $Q_1$, ..., $Q_{N-1}$, generates a prediction threshold value $S_{nn'}$ in accordance with a count n' (n'=0, 1, ..., N−1) and the output value n (n=0, 1, ..., N−1) of the counter 202, and outputs the value $S_{nn'}$ to the comparator 200. The comparator circuit 200 operates in the similar manner to the comparator circuit 116 of the first embodiment. If the comparator circuit 116 outputs a low level signal, the counter circuit 202 holds its present count, and if the comparator circuit 116 outputs a high level signal, the counter circuit 202 decrements by −1 (count down) and supplies the result to the quantization table prediction threshold value generation circuit 204.

When the k small blocks as the length fixing unit are processed, the latch circuit 206 latches the count n' of the counter circuit 202 and outputs it from the output terminal 208. This value n' indicates the quantization table $Q_{n'}$ used for length fixing.

Figure 10:
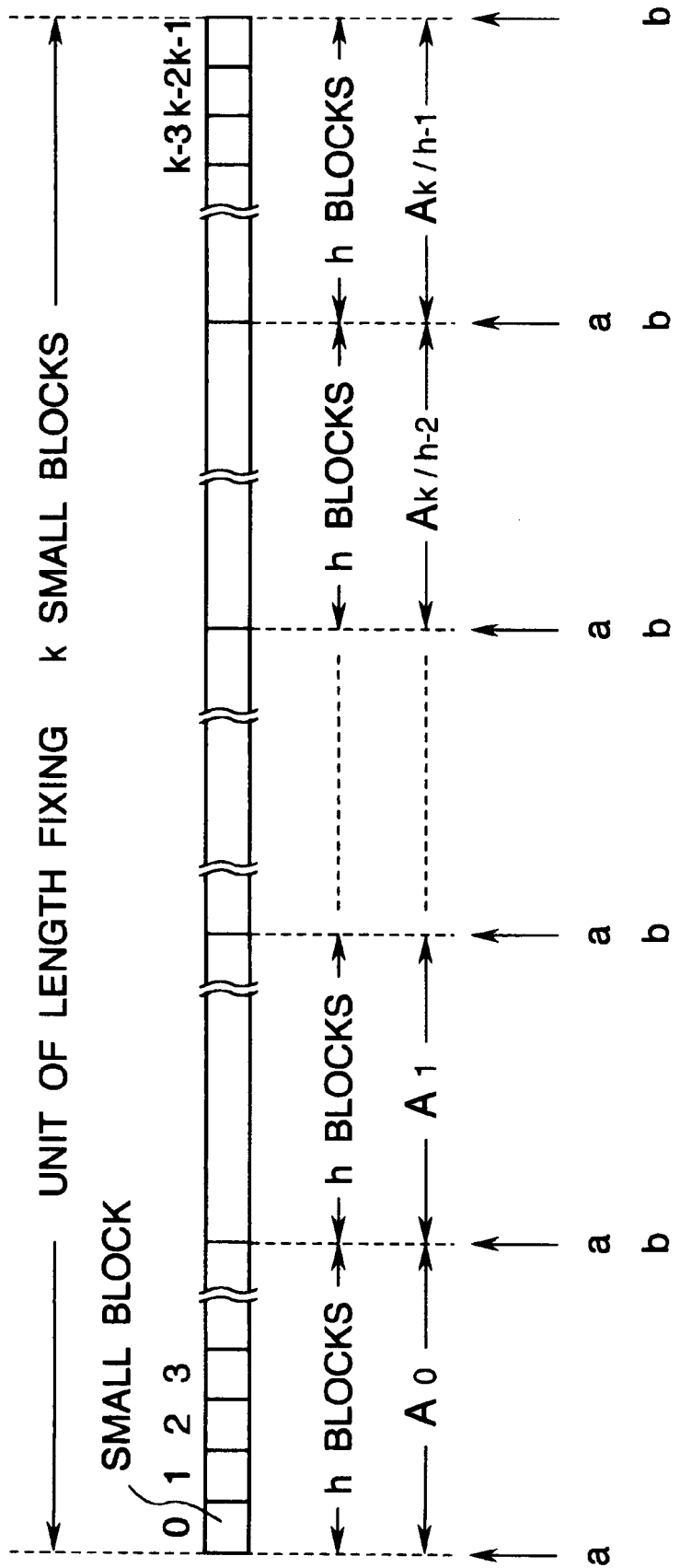
FIG. 10 is a diagram showing the relationship between a length fixing unit and an adaptive quantization circuit unit.

(2) In the example (1), the quantization table prediction threshold value generation circuit 204 stores the prediction threshold values $S_{n0}$, $S_{n1}$, ..., $S_{n(N-1)}$ (n=0, 1, ..., N−1) for each of the quantization tables $Q_0$, $Q_1$, ..., $Q_{N-1}$. However, since the first prediction has already been performed by the preceding circuit B, the prediction threshold values may be, as shown in FIG. 10, $S_{n(n+u)}$, ..., $S_{n(n+1)}$, $S_{nn}$, $S_{n(n-1)}$, ..., $S_{n(n-v)}$ to the predicted value n. For example, u=2 and v=2, or other values. In this case, the counter circuit 202 sets not a value N−1 but a value n+u in accordance with the value n supplied from the latch circuit 122. In this manner, the amount of hardware of the quantization table prediction threshold value generation circuit 204 can be reduced.

Figure 8A:
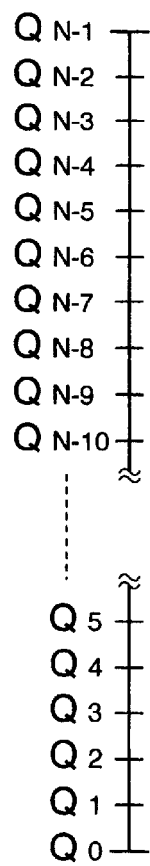
FIGS. 8A to 8D are diagrams illustrating division of a quantization circuit group.
Figure 8B:
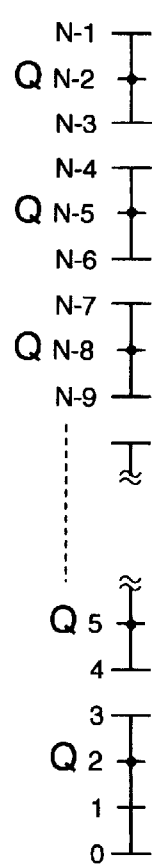
Figure 8C:
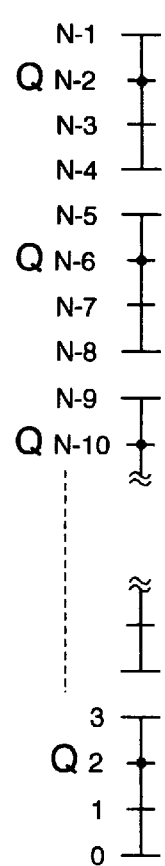
Figure 8D:
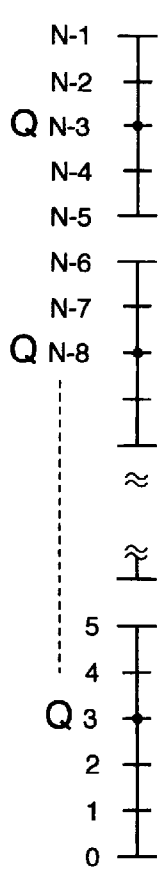

(3) In the examples (1) and (2), the quantization table prediction threshold value generation circuit 204 stores the prediction threshold values for each of the quantization tables $Q_0$, $Q_1$, ..., $Q_{N-1}$ as shown in FIG. 8A. In the example (3), if the latch circuit 122 outputs N−7 as the first prediction result, the quantization table prediction threshold value generation circuit 204 is adapted to generate, for example as shown in FIG. 8C, a prediction threshold value by using the quantization table $Q_{N-6}$. Specifically, the prediction threshold value is generated by $Q_{N-2}$ if the output n of the latch circuit 122 is N−4≦n≦N−1, by $Q_{N-6}$ if the output n is N−8≦n≦N−5, ..., and by $Q_2$ if the output n is 0≦n≦3. In this manner, the amount of hardware of the quantization table prediction threshold value generation circuit 204 can be further reduced. Division of quantization tables may be such as shown in FIGS. 8B and 8D in addition to FIG. 8C.

Similar to the first embodiment, the quantization table prediction threshold value generation circuit 204 selects the prediction threshold value for either the quantization table for the high definition image (HD) or the quantization table for the standard definition image (SD), in accordance with the high definition (HD) image mode signal or standard definition (SD) image mode signal supplied from the input terminal 104.

According to this embodiment, in accordance with the first prediction value n obtained by the first quantization table, the second quantization table is predicted. Accordingly, the quantization table n' more adaptive to the precise length fixing can be predicted.

Figure 9:
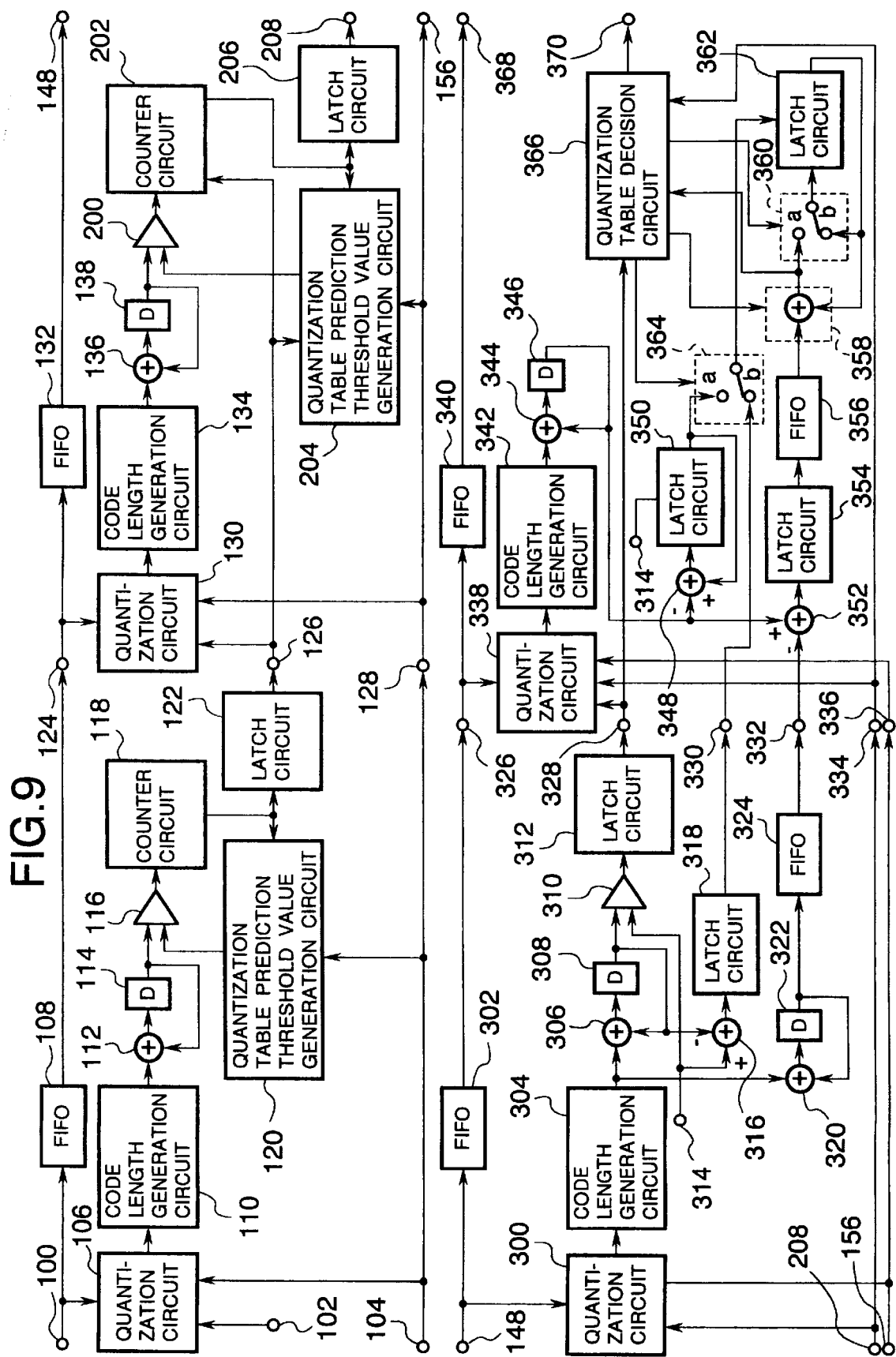
FIG. 9 is a block diagram illustrating a third embodiment of the invention.

FIG. 9 is a block diagram illustrating the third embodiment of this invention. Elements having similar functions to those of the first and second embodiments of FIGS. 4 and 6 are represented by identical reference numerals. Only different points from the first and second embodiments will be described.

Referring to FIG. 9, a quantization circuit 300 quantizes orthogonally transformed (two-dimensional DCT) image data delayed by FIFO 132 by using the quantization table $Q_{n'}$ in accordance with the value n' indicating the predicted quantization table and supplied from the latch circuit 206. The quantized image data is supplied to a code length generation circuit 304 which similar to the code length generation circuits 110 and 134, generates a code length of variable length code (two-dimensional Huffman code) adaptive to the quantized image data, and supplies it to adder circuits 306 and 320. The adder circuit 306 adds the code length supplied from the code length generation circuit 304 to the cumulative value supplied from a latch circuit 308, and supplies the added result to the latch circuit 308.

The latch circuit 308 latches the added result supplied from the adder circuit 306, and supplies it to the adder circuits 306 and 316. Similar to the latch circuits 114 and 138, the latch circuit 308 is reset to "0" each time the k small blocks as the length fixing unit are processed. Therefore, after the k small blocks as the length fixing unit are processed, the latch circuit 8 latches the code amount $RQ_n$ of the k small blocks quantized by the predicted quantization table $Q_{n'}$ and coded in length fixing. The code amount $RQ_{n'}$ of the k small blocks latched by the latch circuit 308 is supplied to a comparator 310 which is also supplied with the target code amount $R_K$ via an input terminal 314. If $RQ_{n'} \leq R_K$, the comparator circuit 310 outputs "0" (low level signal), and if $RQ_{n'} > R_K$, the comparator circuit 310 outputs "1" (high level signal), respectively to a latch circuit 312. The latch circuit 312 latches the comparison result signal of the comparator circuit 310. In other words, the latch circuit 312 latches a signal indicating whether the code amount is within the target code amount or is overflowed. An output of the latch circuit 308 is also supplied to the adder circuit 316.

The adder circuit 316 outputs a difference between the output of the latch circuit 308 and the target code amount $R_K$ supplied via the input terminal 314. The latch circuit 318 latches and outputs a difference $Q_{n'} = R_K - RQ_{n'}$ between the target code amount $R_K$ outputted from the adder circuit 316 and the code amount $RQ_{n'}$ of the image data quantized by the quantization table $Q_{n'}$ and coded in length fixing. An adder circuit 320 adds the code length generated from the code length generation circuit 304 to the cumulative value supplied from a latch circuit 322, and supplies the added value to the latch circuit 322.

In transmitting or recording coded data, it becomes necessary for the decoding side to know what quantization table was used at the coding side. Therefore, the quantization table used for quantization is transmitted or recorded together with the coded data by any one of transmission or recording methods. Assuming that as shown in FIG. 10, image data is sent in the h small block unit ($1 \leq h \leq k$, where h is a divisor of k), then the latch circuit 322 is reset to "0" each time h small blocks (each a point shown in FIG. 10) are processed during the processing period of the k small blocks as the length fixing unit. In other words, the latch circuit 322 outputs the code amount $RQ_{n'r}$ ($0 \leq r \leq k/(h-1)$) every h small blocks.

A FIFO 324 receives a value of the latch circuit 322 before it is reset to "0", i.e., receives the code amount $RQ_{n'r}$ (code amount for h small blocks) at the b point shown in FIG. 10. Namely, FIFO 324 receives a value for k/h small blocks during the process period of the k small blocks as the length fixing unit. A FIFO 302 delays the orthogonally transformed (two-dimensional DCT) image data by a time required for the above processes.

Next, in accordance with the value n' indicating the predicted quantization table and supplied from the latch circuit 206 and with the output signal of the latch circuit 312, a quantization circuit 338 quantizes the delayed image data supplied from FIFO 302, by selecting the quantization table $Q_{n'+1}$ having a smaller quantization step than the quantization table $Q_{n'}$ if the signal of the latch circuit 312 is "0" (low level signal) and by selecting the quantization table $Q_{n'-1}$ having a larger quantization step than the quantization table $Q_{n'}$ if the signal of the latch circuit 312 is "1" (high level signal). After the delayed image data is quantized by the quantization circuit 338, it is supplied to a code length generation circuit 342. Similar to the code length generation circuits 110, 134, and 304, the code length generation circuit 342 generates a code length of variable length code, and supplies it to an adder circuit 344.

The adder circuit 344 adds the code length supplied from the code length generation circuit 342 to the cumulative code length supplied from a latch circuit 346, and supplies the added value to the latch circuit 346. The latch circuit 346 latches the output of the adder circuit 344, and outputs it to the adders 344, 348, and 352. Similar to the latch circuit 322, the latch circuit 346 is reset to "0" each time h ($1 \leq h \leq k$) small blocks are processed during the process period of the k small blocks as the length fixing unit. At the timing when the latch circuit 346 latches the code amount $RQ_{(n'+1)r}$ ($0 \leq r \leq k/(h-1)$) if the output of the latch circuit 312 is "0" or the code amount $RQ_{(n'-1)r}$ if the output of the latch circuit 312 is "1", the code amount $RQ_{n'r}$ is read from FIFO 324 to calculate a difference of $RQ_{(n'+1)r} - RQ_{n'r}$ (or $RQ_{(n'-1)r} - RQ_{n'r}$) at the adder circuit 352. A latch circuit 354 latches the calculated difference of $RQ_{(n'+1)r} - RQ_{n'r}$ (or $RQ_{(n'-1)r} - RQ_{n'r}$), and supplies it to a FIFO 356 which loads it in. Next, the operation of this encoding apparatus will be described for the cases where the output of the latch circuit 312 is "0" or "1".

(1) When the output of the latch circuit 312 is "0" (low level), a switch 364 selects a terminal b to supply an output def $Q_{n'=RK} - RQ_{n'}$ of the latch circuit 318 to a latch circuit 362. The latch circuit 362 loads def $Q_{n'}$. After the calculation of a code length of the image data of the k small blocks is completed and the k/h values $RQ_{(n'+1)0} - RQ_{n'0}$, $RQ_{(n'+1)1} - RQ_{n'1}, \ldots, RQ_{(n'+1)(k/(h-1))} - RQ_{n'(k/(h-1))}$ are loaded in FIFO 356, first $RQ_{(n'+1)0} - RQ_{n'0}$ is read from FIFO 356 and outputted to an adder circuit 358. The adder circuit 358 subtracts $RQ_{(n'+1)0} - RQ_{n'0}$ from the output def $Q_{n'}$ of the latch circuit 362, and supplies the result def $Q_{n'} - (RQ_{(n'+1)0} - RQ_{n'0})$ to a terminal a of the switch 360 and to a quantization table decision circuit 366.

The quantization table decision circuit 366 decides the quantization table $Q_{n'+1}$ for the h small blocks in this section ($A_0$ section in FIG. 10) if the output def $Q_{n'}-(RQ_{n'+1)0}-RQ_{n'0})$ is "0" or larger, and controls to select the terminal a of the switch 360. The latch circuit 362 latches the output def $Q_{n'}-(RQ_{(n'+1)0}-RQ_{n'0})$ and supplies it to the adder circuit 358. Contrary, the quantization table decision circuit 366 decides the quantization table $Q_{n'}$ for the h small blocks in this section ($A_0$ section in FIG. 10) if the output def $Q_{n'}-(RQ_{(n'+1)0}-RQ_{n'0})$ is negative, and controls to select the terminal b of the switch 360. The latch circuit 362 latches again the output def $Q_{n'}$ and supplies it to the adder circuit 358.

Next, $RQ_{(n'+1)1}-RQ_{n'1}$ is read from FIFO 356 and outputted to the adder circuit 358. The adder circuit 358 subtracts $RQ_{(n'+1)1}-RQ_{n'1}$ from the output of the latch circuit 362, and supplies the result to the terminal a of the switch 360 and to the quantization table decision circuit 366. Similar to the above, the quantization table decision circuit 366 decides the quantization table $Q_{n'+1}$ for the h small blocks in this section ($A_1$ section in FIG. 10) if the output of the adder circuit 358 is "0" or larger, and controls to select the terminal a of the switch 360. The latch circuit 362 latches the output of the adder circuit. Contrary, the quantization table decision circuit 366 decides the quantization table $Q_{n'}$ for the h small blocks in this section ($A_1$ section in FIG. 10) if the output of the adder circuit 358 is negative, and controls to select the terminal b of the switch 360. The latch circuit 362 latches again the output def $Q_{n'}$.

In the manner described above, quantization tables for the sections $A_0, A_1, \ldots, A_{(k/(h-1))}$ are sequentially decided. For example, if k=30 and h=6, quantization tables ($Q_{n'+1}, Q_{n'}, Q_{n'+1}, Q_{n'+1}, Q_{n'}$) are decided for the sections ($A_0, A_1, A_2, A_3, A_4$). The decided quantization table is transmitted via a terminal 370. A FIFO 340 delays the orthogonally transformed image data by a time required for deciding the quantization table.

(2) Next, the operation when the latch circuit 312 outputs "1" (high level, in excess of the target code amount $R_K$) will be described.

At the start of processing the k small blocks as the length fixing unit, the latch circuit 350 is loaded with the target code amount $R_K$ via the input terminal 314. When the code amount at the latch circuit 346 takes a value $RQ_{(n'-1)0}$ corresponding to the section $A_0$ shown in FIG. 10, the adder circuit 348 calculates $R_K-R_{(n'-1)0}$ and supplies the result to the latch circuit 350 which latches the output $R_K-R_{(n'-1)0}$ of the adder circuit 348. When the code amount at the latch circuit 346 takes a value $RQ_{(n'-1)1}$ corresponding to the section $A_1$ shown in FIG. 10, the adder circuit 348 subtracts the value $RQ_{(n'-1)1}$ from the output $R_K-R_{(n'-1)0}$ of the latch circuit 350 and outputs $R_K-R_{(n'-1)0}-RQ_{(n'-1)1}$ to the latch circuit 350 which latches the output $R_K-R_{(n'-1)0} RQ_{(n'-1)0}-RQ_{(n'-1)1}$ of the adder circuit 348.

When the k small blocks are processed, the value latched by the latch circuit 350 is def $Q_{(n'-1)}=R_K-R_{(n'-1)0}-RQ_{(n'-1)1}-\ldots-R_{(n'-1)(k/(h-2))}-R_{(n'-1)(k/(h-1))}$. When the value def $Q_{(n'-1)}$ is obtained, the terminal a of the switch 364 is selected and the value def $Q_{(n'-1)}$ is loaded in the latch circuit 362. Similar to the example (1), the k/h values $RQ_{(n'-1)0}-RQ_{n'0}, RQ_{(n'-1)1}-RQ_{n'1}, \ldots, RQ_{(n'-1)(k/(h-1))}-RQ_{n'(k/(h-1))}$ are loaded in FIFO 356.

In the example (1), the adder circuit 358 subtracts the value read from FIFO 356 from the output of the latch circuit 362. However, in this example (2), the values loaded in FIFO, including the k/h values $RQ_{(n'-1)0}-RQ_{n'0}, RQ_{(n'-1)1}-RQ_{n'1}, \ldots, RQ_{(n'-1)(k/(h-1))}-RQ_{n'(k/(h-1))}$, are negative. Therefore, the adder circuit 358 adds the output of the latch circuit 362 to the output of FIFO 356, and the other operations thereof are similar to the example (1). In this manner, the quantization tables for the sections $A_0, A_1, \ldots, A_{k/(h-1)}$ are decided. For example, if k=30 and h=6, quantization tables ($Q_{n'}, Q_{n'}, Q_{n'-1}, Q_{n'-1}, Q_{n'-1}$) are decided for the sections ($A_0, A_1, A_2, A_3, A_4$).

The quantization circuits 300, 338 select either the quantization table for the high definition image (HD) or the quantization table for the standard definition image (SD), in accordance with the high definition (HD) image mode signal or standard definition (SD) image mode signal supplied from the input terminal 104.

As described above, according to this embodiment, the k small blocks as the length fixing unit are quantized by using the predicted quantization table, and the code amount is calculated. The image data is further quantized by using a quantization table having a step width smaller than another quantization table predicted by the difference from the target code amount, or by using a quantization table having a larger step width. In this manner, the quantization table is decided so as to make the difference from the target code amount for the h ($1 \leq h \leq k$) small block unit as small as possible. Accordingly, less degraded and highly precise images can be formed. In addition, an overflow to be caused by a miss of prediction can be dealt with.

Figure 11:
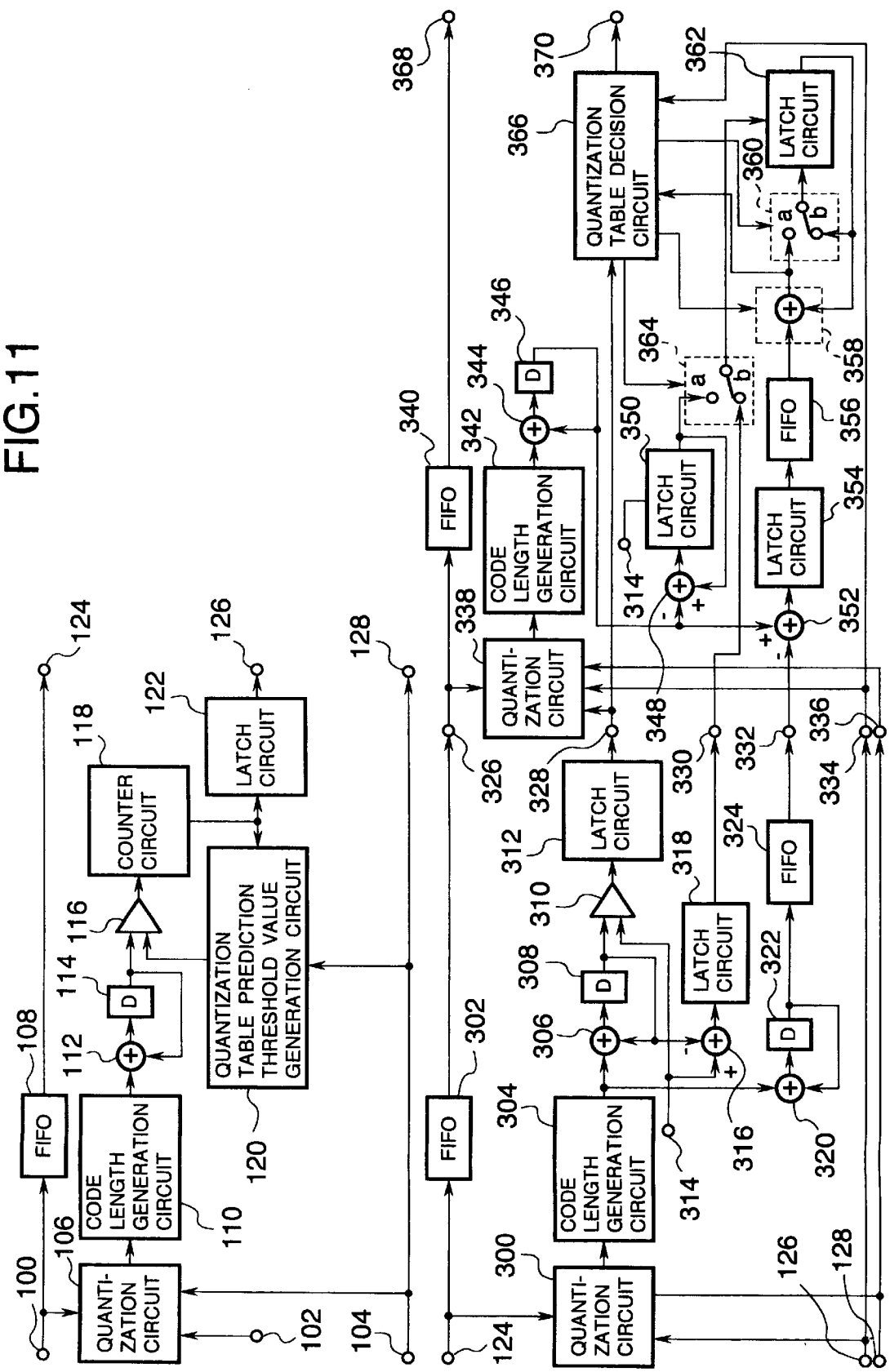
FIG. 11 is a block diagram showing a modification of the third embodiment of the invention.

This embodiment can be realized also by the structure shown in FIG. 11. The circuit shown in FIG. 11 removes the circuit of FIG. 9 connected between the terminals 124, 126, and 128 and the terminals 148, 208, and 156. The operation of this circuit is similar to the above embodiment, and so the description thereof is omitted. With this circuit, the amount of hardware can be reduced further.

Figure 12:
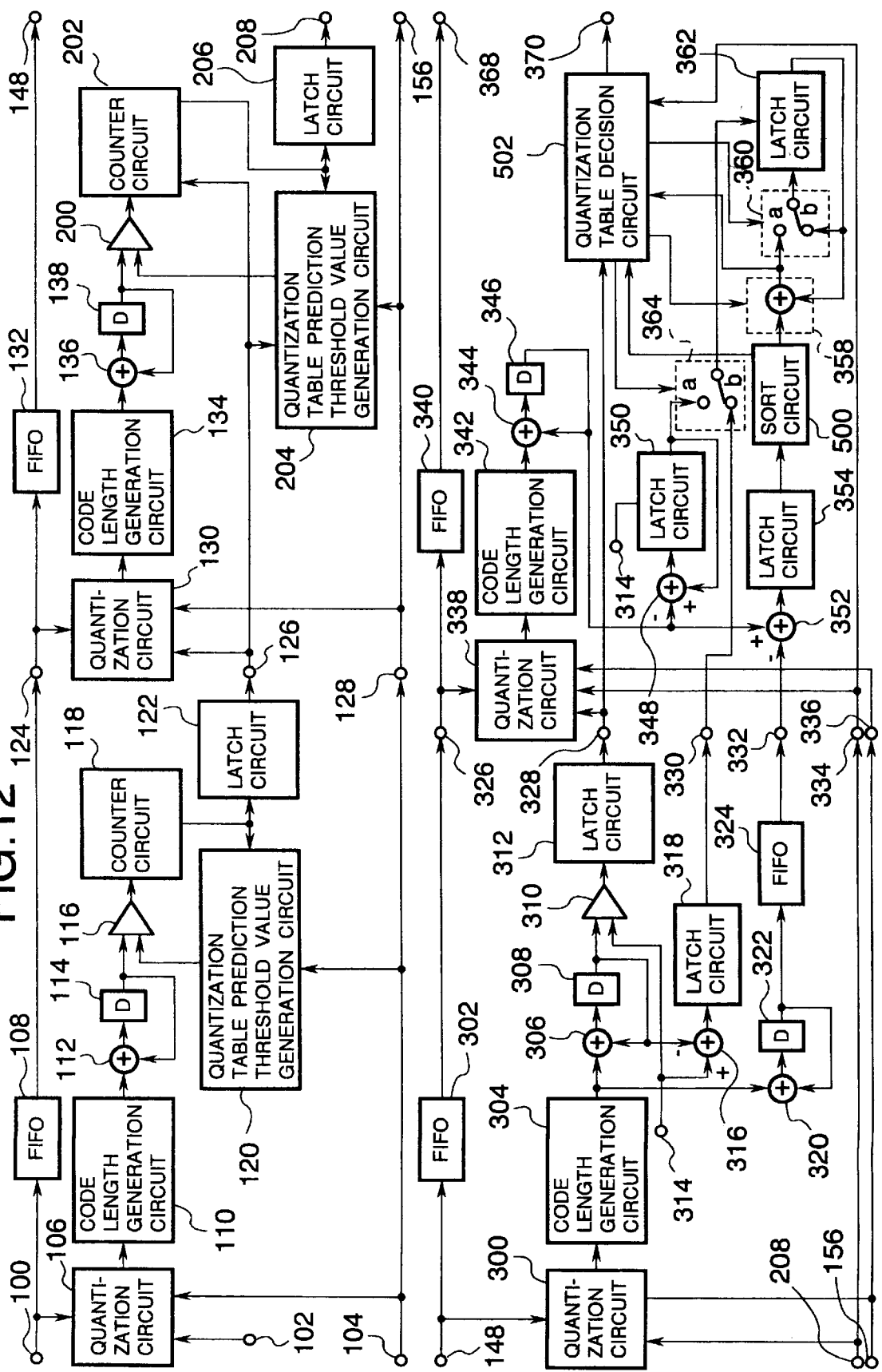
FIG. 12 is a block diagram illustrating a fourth embodiment of the invention.

FIG. 12 is a block diagram showing the fourth embodiment of the invention. Elements having similar functions to those of the first to third embodiments are represented by identical reference numerals. Only different points from the first to third second embodiments will be described.

Referring to FIG. 12, a sort circuit 500 sorts the values latched by the latch circuit 354 in the descending order of their absolute values. Assuming that k=30 and h=6 and the output of the latch circuit 312 is "0" (low level), the operation of this circuit will be described. The sort circuit 500 sorts the values latched by the latched circuit 354, including the values $RQ_{(n'+1)0}-RQ_{n'0}, RQ_{(n'+1)1}-RQ_{n'1}, \ldots, RQ_{(n'+1)4}-RQ_{n'4}$, in the descending order of their absolute values, for example, into $RQ_{(n'+1)2}-RQ_{n'2}, RQ_{(n'+1)0}-RQ_{n'0}, RQ_{(n'+1)3}-RQ_{n'3}, RQ_{(n'+1)1}-RQ_{n'1}$, and $RQ_{(n'1)4}-RQ_{n'4}$. The value is read in the sorted order, first, the value $RQ_{(n'+1)2}-RQ_{n'2}$, and the processes similar to the third embodiment are performed. In this case, the quantization table decision circuit 502 receives sort information from the sort circuit 500, and decides the quantization table in the order of the sections ($A_2, A_0, A_3, A_1, A_4$) shown in FIG. 10. The operations of the sort circuit 500 and quantization table decision circuit 502 are basically similar also for the case wherein the output of the latch circuit 312 is "1" (high level), and so the description thereof is omitted. Similar to the third embodiment, this embodiment is also compatible both with the high definition (HD) and standard definition (SD) images.

As described above, according to the fourth embodiment, the k small blocks as the length fixing unit are quantized by using the predicted quantization table, and the code amount is calculated. The image data is further quantized by using a quantization table having a step width smaller than another quantization table predicted by the difference from the target code amount, or by using a quantization table having a larger step width. A difference from the code amount relative to the quantization table predicted by the h ($1 \leq h \leq k$) small block unit is calculated. The larger the absolute value of the difference, the larger the code amount is assigned so as to make the code amount near to the target code amount. Accordingly, less degraded and highly precise images can be formed. In addition, an overflow to be caused by a miss of prediction can be dealt with.

Figure 13:
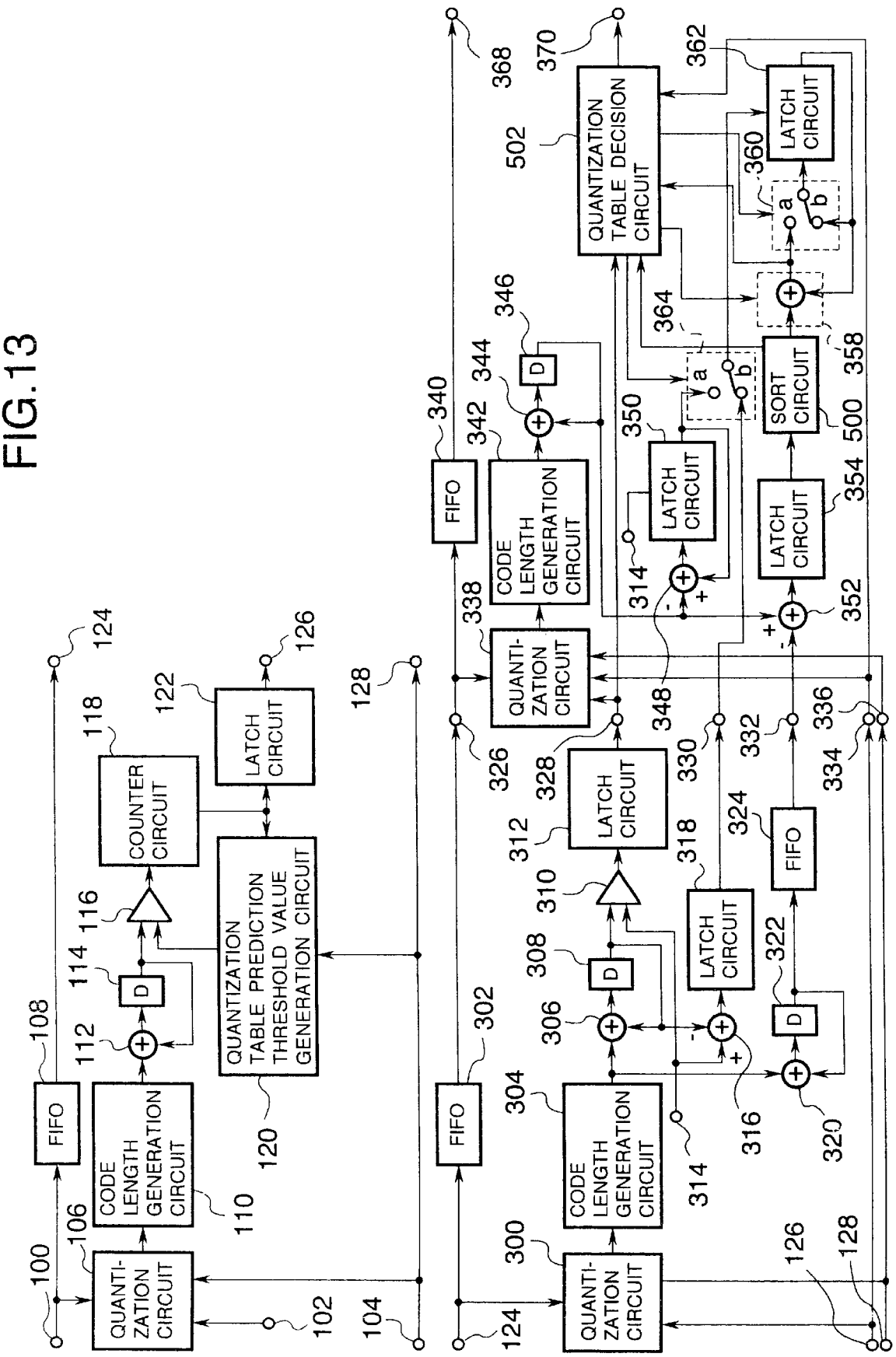
FIG. 13 is a block diagram showing a modification of the fourth embodiment of the invention.

This embodiment can be realized also by the structure shown in FIG. 13. The circuit shown in FIG. 13 removes the circuit of FIG. 12 connected between the terminals 124, 126, and 128 and the terminals 148, 208, and 156. The operation of this circuit is similar to the above embodiment, and so the description thereof is omitted. With this circuit, the amount of hardware can be reduced further.

In this embodiment, the values $RQ_{n'r}$ ($0 \leq r \leq k/(h-1)$) inputted to FIFO 324 or the output values $RQ_{(n'+1)r}$ or $RQ_{(n'-1)r}$ of the latch circuit 346 may be sorted in the descending order and the quantization table is decided in this order.

As described so far, the structures of the above embodiments provide a quantizer suitable for length fixing with a small amount of hardware and less degraded and high quality images can be formed.

If the calculated code amount is the target code amount or smaller, the quantizer having a finer quantization step than the predicted quantizer is used. If the calculated code amount is in excess of the target code amount, the quantizer having a more coarse quantization step than the predicted quantizer is used. The two quantizers are adaptively selected in the length fixing unit (in k small blocks). In this manner, length fixing having a smaller difference from the target code amount can be performed and images of higher quality can be formed.

What is claimed is:

1. Apparatus for predicting and finely adjusting a quantization step by which input image data can be quantized so as to obtain code data from the quantized image data whose code amount is within a predetermined range, comprising:

(a) input means for inputting the image data, said input means being capable of selectively inputting a plurality of image data of different types;

(b) block forming means for dividing the input image data into blocks, each block comprising a plurality of pixels;

(c) prediction means for predicting a quantization step for obtained the code amount in the predetermined range for every m blocks of the image data, being an integer; and (d) adjustment means for finely adjusting the quantization step predicted by said prediction means for n blocks among the m blocks, n being an integer and satisfying a condition of $1 \leq n < m$.

2. An apparatus according to claim 1, wherein said input means is selectively inputs high definition image data and standard definition image data.

3. An apparatus according to claim 2, wherein said prediction means performs different prediction processings for high definition image data and standard definition image data respectively.

4. An apparatus according to claim 1, wherein said prediction means includes:

generation means for quantizing the image data by a predetermined quantization step and for generating code amount data corresponding to an amount of code provided when the quantized image data is coded; and conversion means for receiving the code amount data and converting the received code amount data into data indicating a quantization step by which the code amount in the predetermined range can be obtained, said conversion means converting the code amount data by using a predetermined parameter.

5. An apparatus according to claim 4, wherein the predetermined parameter is data in a table which stores data of a quantization step for obtaining the code amount in the predetermined range, in connection with the code amount provided when the image data quantized by the predetermined quantization step is coded.

6. A method for determining a quantization step by which image data can be quantized so as to obtain code data from the quantized image data whose code amount is within a predetermined range, comprising the steps of:

(a) inputting the image data;

(b) quantizing the image data input by said input step by a predetermined quantization steps, and generating code amount data corresponding to an amount of code provided when the quantized image data is coded;

(c) receiving the code amount data and converting the code amount data into indicating data indicating a quantization step by which the code amount within the predetermined range can be obtained;

(d) delaying the image data input by said input step; and (e) encoding the image data delayed by said delay step by using the quantization step indicated by the indicating data.

7. Apparatus for determining a quantization step by which image data can be quantized so as to obtain code data from the quantized image data whose code amount is within a predetermined range, comprising:

(a) input means for inputting the image data;

(b) generation means for quantizing the image data input by said input means by a predetermined quantization step, and for generating code amount data corresponding to an amount of code provided when the quantized image data is coded;

(c) conversion means for receiving the code amount data and converting the code amount data into indicating data indicating a quantization step by which the code amount within the predetermined range can be obtained;

(d) delay means for delaying the image data input by said input means; and (e) encoding means for encoding the image data delayed by said delay means by using the quantization step indicated by the indicating data.

8. An apparatus according to claim 7, wherein said input means inputs the image data in blocks, each block comprising a predetermined number of pixels.

9. An apparatus according to claim 8, wherein the code amount is controlled for each m blocks, m being an integer.

10. An apparatus according to claim 7, wherein the indicating data is data in a table which stores data of a quantization step for obtaining the code amount in the predetermined range, in connection with the code amount provided when the data quantized by said predetermined quantization step is coded.

11. An apparatus according to claim 7, wherein said input means is for selectively inputting high definition image data and standard definition image data.

12. An apparatus according to claim 11, wherein said conversion means performs different conversion processings for high definition image data and standard definition image data respectively.

13. An apparatus according to claim 7, wherein said input means can selectively input image data of different types.

14. An apparatus according to claim 13, wherein said conversion means changes a conversion processing according to the type of the input image data.

15. An apparatus according to claim 14, wherein said input means is selectively inputting high definition image data and standard definition image data.

16. A method for predicting an finely adjusting a quantization step by which input image data can be quantized so as to obtain code data from the quantized image data whose code amount is within a predetermined range, comprisings:

(a) inputting the image data, wherein in said input step, a plurality of image data of different types can be selectively input;

(b) dividing the input digital image data into blocks, each block comprising a plurality of pixels;

c) predicting a quantization step for obtaining the code amount in the predetermined range for every m blocks of the image data, m being an integer; and finely adjusting the quantization step predicted in said prediction step for n blocks among the m blocks, n being an integer and satisfying a condition of $1 \leq n < m$.

* * * * *

UNITED STATES PATENT AND TRADEMARK OFFICE
CERTIFICATE OF CORRECTION

PATENT NO. : 5,905,578

DATED : May 18, 1999

INVENTOR(S) : AKIO FUJII, ET AL.

It is certified that error appears in the above-identified patent and that said Letters Patent is hereby corrected as shown below:

On the title page,
AT [56] REFERENCES CITED

FOREIGN PATENT DOCUMENTS

"2638926  11/1988  France" should read
--2638926  5/1990  France--; and
"05252403  9/1993  Japan" should read
--5-252403  9/1993  Japan--.

COLUMN 13

Line 53, "obtained" should read --obtaining--;
Line 61, "is" should be deleted.

COLUMN 16

Line 1, "an" should read --a--; and
"a" should be deleted.

Signed and Sealed this

Twelfth Day of September, 2000

Attest:

Q. TODD DICKINSON

*Attesting Officer*   *Director of Patents and Trademarks*